Jan. 1, 1963  W. C. CORNELIUS  3,070,975
STRUCTURE FOR COOLING WATER HEATED IN COOLING AUTOMOBILE ENGINE
Filed Sept. 26, 1958
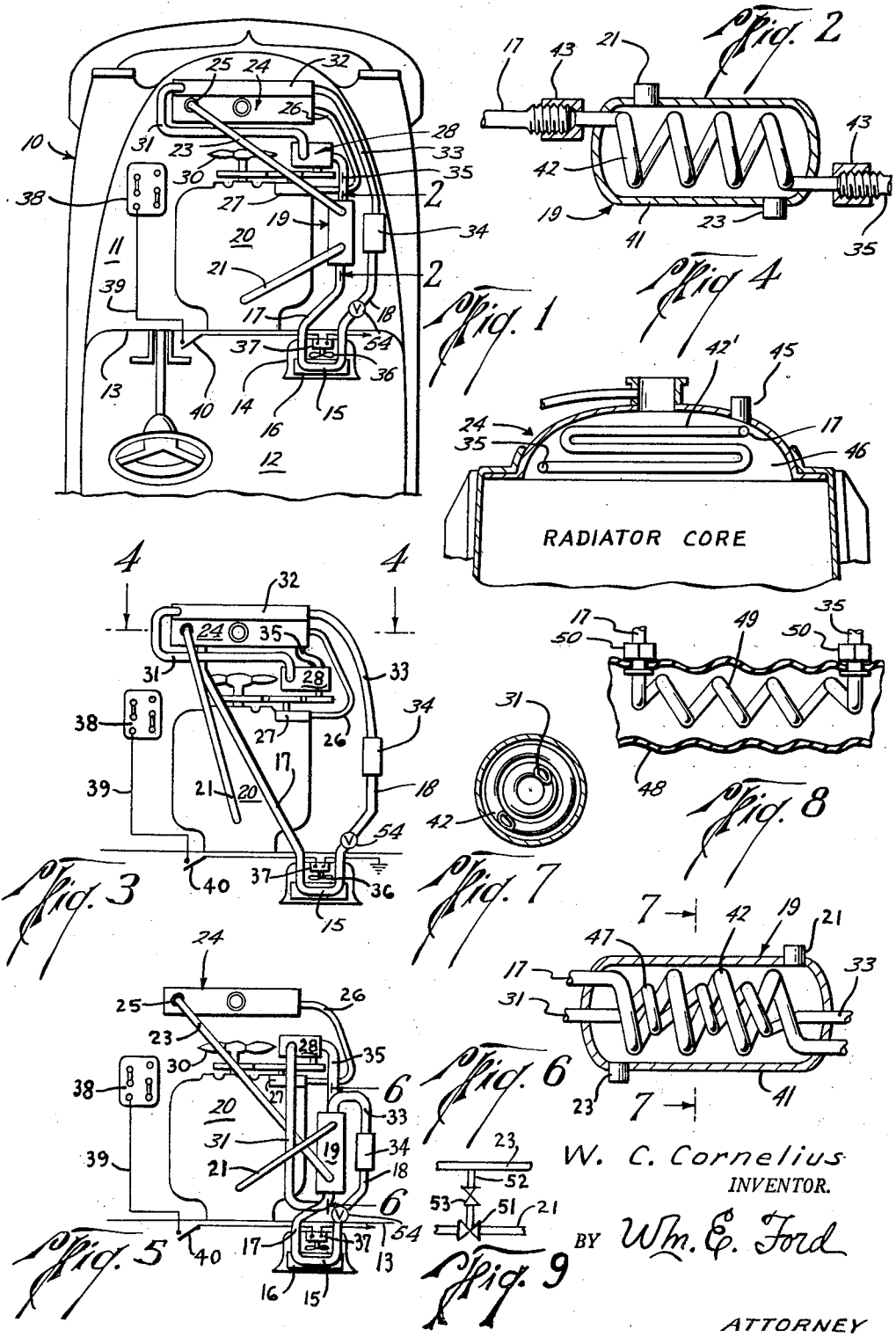
W. C. Cornelius
INVENTOR.
BY Wm. E. Ford
ATTORNEY

United States Patent Office 3,070,975
Patented Jan. 1, 1963

3,070,975
STRUCTURE FOR COOLING WATER HEATED IN COOLING AUTOMOBILE ENGINE
W. C. Cornelius, % Lo-Merc Corp., 2402 Houston Ave., Houston, Tex.
Filed Sept. 26, 1958, Ser. No. 763,645
6 Claims. (Cl. 62—238)

This invention relates to a method of cooling the hot water which has been employed in cooling the automobile engine of an automobile which is conventionally air conditioned, the return refrigerant from the evaporator being employed for this purpose and brought into association with the hot water after it leaves the automobile engine manifold and before it is returned to the radiator.

It is therefore a primary object of this invention to provide a method and structure for cooling automobile engine manifold hot water by associating therewith the return refrigerant coil from the conventional air conditioning system evaporator.

It is also an object of this invention to provide a method and structure of this class for cooling automobile engine manifold hot water in a heat exchanger interjected between the automobile engine manifold hot water return and the radiator, the cooler also being interjected between the conventional evaporator refrigerant return and the compressor.

It is also an object of this invention to provide a method and structure of this class for thus cooling automobile engine manifold hot water by associating such hot water with the conventional evaporator refrigerant return coil in the top of the automobile radiator before the water begins percolating downwardly through the radiator core, and before the refrigerant returns to the conventional compressor.

It is also another and further object of this invention to provide a method and structure of this class which eliminates the conventional condenser of the air conditioning system of the automobile by interjecting a heat exchanger between the conventional compressor discharge and the conventional evaporator inlet so that the heat exchanger tends to reduce the form of the high pressure refrigerant gas; the heat exchanger also receiving the conventional evaporator refrigerant return coil therethrough prior to its return to the conventional compressor; and also receiving therein the automobile engine manifold hot water prior to its return to the automobile radiator.

Other and further objects will be apparent when the herein specification is considered in connection with the drawings, in which:

FIG. 1 is a plan view, partially diagrammatic, showing a form of this invention and its relative relation to the automobile engine and the front of the automobile, including the forward part of the passenger compartment;

FIG. 2 is a sectional elevational view, partially diagrammatic, taken along line 2—2 of FIG. 1;

FIG. 3 is a plan view, partially diagrammatic, showing another form of the invention and the essential structure associated therewith;

FIG. 4 is a sectional elevation taken along line 4—4 of FIG. 3;

FIG. 5 is a plan view, partially diagrammatic, showing a further form of the invention and the essential structures associated therewith;

FIG. 6 is a sectional elevation taken along line 6—6 of FIG. 5;

FIG. 7 is a transverse elevational view taken along line 7—7 of FIG. 6;

FIG. 8 is a fragmentary sectional view showing still another form of the invention; and FIG. 9 is a fragmentary diagrammatical view, indicating a means whereby only part of the water circulated in heated condition from the automobile engine manifold may be employed in the practice of this invention.

Referring in particular to the drawings in which like reference numerals are assigned to like elements in the various views, FIG. 1 shows a conventional automobile vehicle 10 having an engine compartment 11 and a passenger compartment 12 divided from each other by a partition 13 termed the dashboard upon which the instrument panel of the automobile is located. Such partition 13 is usually insulated to prevent heat and fumes from the engine compartment from entering the passenger compartment. A conventional evaporator 14 of an air conditioning system is shown in the passenger compartment equipped with the conventional fin type of heat exchanger evaporator coil 15 within a conventional open housing 16, such coil 15 having a conventional refrigerant return coil 17 and a conventional inlet coil 18 connected to the respective ends thereof. As is well known in the field of automobile air conditioning, space limitations dictate a relatively small evaporator which cannot evaporate all of the refrigerant into a gas, even on the hottest days.

The engine 20 in the engine compartment 11 conventionally has a hot water return hose which extends from the engine manifold block to the conventional automobile radiator. This invention changes such conventional arrangement by providing a water return hose 21 extending from the manifold block 20 to a cooler or heat exchanger unit 19 to be hereinafter described in detail. In FIG. 1 the return refrigerant coil 17 from the conventional evaporator 14 is also shown connected to the heat exchanger unit or cooler 19. From the end of the cooler 19 opposite the end which receives the engine manifold hot water a hose 23 is shown taking water from the cooler 19 to deliver it into the automobile radiator 24 at a point 25. The radiator 24 is of conventional design so that the water delivered into the top thereof percolates downwardly through the intricate maze of cooling paths provided by the radiator core, and from the bottom of the coil the water, now cooled, returns through a hose or conduit 26 to the suction end of a pump 27 which discharges such water into the manifold block of the engine 20 to be recirculated therethrough for the purpose of cooling the engine.

A conventional compressor 28 of the type employed to handle the refrigerant, as Freon, employed by the conventional air conditioning system, is shown in FIG. 1 having its pulley driven by the same belt 29 which drives the pulley of the pump 27, and also the pulley on the end of the shaft of the engine 20 on which the fan 30 is mounted. Such compressor discharges refrigerant as a hot pressurized gas conventionally through a discharge conduit 31 into a conventional condenser 32. As is well known, space considerations in automobiles conventionally require that the condenser is generally spaced in front of the automobile radiator 24; also, as is well known, placing the condenser in this position impairs air circulation through the radiator while the heat dissipated by the condenser retards the water cooling in the radiator. In such condensers the refrigerant heat is dissipated away and the refrigerant is liquefied, and water in the form of moisture or vapor which may have undesirably entered the system is carried along with the cooled liquid refrigerant through a conduit 33 leading to a dryer 34, which is in effect a moisture filter such as a gel which takes up, collects, and absorbs any vapor or moisture so that the refrigerant leaves the dryer 34 as a substantially pure pressurized liquid refrigerant. After passing through the drying process the refrigerant conventionally passes into a conduit 18 having therein a conventional capillary tube or expansion valve, such feature now being indicated in the drawings by a valve symbol 54. The refrigerant passes through the expansion valve 54, which is in effect a needle valve, with the consequence that the pressure thereon is relieved and the refrigerant can flow out into the evaporator in form of a pressure relieved liquid, and thus with high capacity to absorb heat.

Since the conventional evaporator coil 15, with which the conduit 18 connects immediately downstream of the expansion valve 34, is in communication with the passenger compartment 12 of the automobile which has its windows closed when the automobile is running, the heat in the passenger compartment is immediately drawn from the air therein into the refrigerant passing through the evaporator coil 15, and thus the passenger compartment is amply refrigerated.

In this regard it is pointed out that conventional compressor and refrigerant capacity considered in conjunction with evaporator space limitations are nevertheless calculated to achieve ample cooling of automobile passenger compartments while at the same time the evaporator cannot evaporate all of the refrigerant into a gas during the time that any reference amount of refrigerant is in passage from the expansion valve through the evaporator coil 15 to the discharge conduit 17 into which the evaporator coil 15 connects. The refrigerant thus passes through the discharge conduit 17 as a partially vaporized gas and into the cooler 19 wherein it is subjected to the heat imparted thereto from the hot water from the engine block to be completely gasified by such heat. In order to insure that effective refrigeration is obtained a fan 36 is provided to draw in the air from the passenger compartment 12 and discharge it over the evaporator coil 15. The motor 37 for such fan is battery driven, and for this purpose the conventional automobile battery 38 is shown having a conductor 39 extending from one terminal thereof to a switch 40 which is connected to a terminal of the fan motor 37, the other terminal thereof being grounded.

The cooler 19 is shown in detail in FIG. 2 and comprises a drum or housing 41 having a coil 42 therein of substantially the size of the refrigerant return coil 17. A fitting 43 effects connection between the coil 42 and the refrigerant return coil 17, and in like manner a similar fitting 43 connects the opposite end of the coil 42 to the conduit 35 which carries the refrigerant back to the compressor. Such housing 41 has an inlet 21 therein to receive water which has been heated in cooling the automobile engine block and the housing 41 also has a water discharge outlet 23 therefrom which connects with the return conduit, such as the hose 23, which takes the engine manifold water, cool in degree due to association with the return refrigerant, and delivers such water to the radiator 24 for further cooling.

It is obvious that since the coil 42 within the cooler 19 is of smaller diameter than the discharge conduit 17 from the evaporator, and then the return conduit 35 from the cooler 19 to the compressor 28, the result follows that there is sufficient choke down in the system that the refrigerant takes longer to pass through the evaporator coil 15 than under conditions where conventional systems are employed. Thus with this invention a higher percentage of the refrigerant is evaporated in passage through the coil 15. Add to this the heat added to the refrigerant in passage through the cooler 19, and it is readily accountable how the refrigerant can arrive at the compressor 28 in completely gaseous state, thereby carrying therewith no liquid or vapor which may place unnecessary load upon and harm the compressor 28 which is in essence a gas pump designed for operation with pure gases.

In the form of the invention shown in FIGS. 3 and 4 a cooler is not employed but instead the return refrigerant conduit 17 delivers a refrigerant from the evaporator into a coil 42' in the upper part of a conventional automobile radiator 24, while the refrigerant return coil 35 connects to the other end of the coil 42' and returns such refrigerant in liquefied, heated state, back to the compressor 28.

In this form of the invention the water hose 21 receives the hot water after it has cooled the engine and delivers it into the top of the radiator through a conventional connection 45. The hot water then fills the top compartment 46 of the radiator where it is cooled thru association with the refrigerant coil 42', and thus when such water percolates downwardly through the radiator core it has already been cooled to some considerable degree and thus the burden imposed upon the radiator core is less than is conventionally imposed.

In the form of invention shown in FIGS. 5, 6, and 7 the refrigerant return coil 17 from the evaporator connects to a coil 42 which extends through the cooler housing 41, as in the case of the form of invention shown in FIGS. 1 and 2. Additionally, in this form of invention, the discharge coil 31 from the compressor 28 connects into a coil 47 within the cooling housing 41, such coil being shown as passing through the housing 41 concentric within the return coil 42 and thereafter the refrigerant coil 33 leads the refrigerant to a dryer 34 from which the connection coil 18 conducts it to the evaporator coil 15.

A modification of the form of invention shown in FIGS. 1 and 2 and also a modification of the form of invention shown in FIGS. 5 and 6 is shown in FIG. 8, in which the conventional flexible hose 48, employed to serve as conduit for the hot water passing from the engine block 20 to the radiator 24, has connected thereinto a coil 49 which is comparable to the coil 42 shown in FIG. 2 in its function of cooling the water in such hose. In this usage the return refrigerant coil 17 from the evaporator coils 15 connects to an end of the coil 49 where it extends through the wall of the hose 48, a suitable seal and fitting 50 being shown provided to effect such connection. In like manner the other end of the coil 49 extends through a hole in the wall of the hose 48 and a fitting 50 effects connection with the coil 35 returning the refrigerant from the hose 48 to the compressor 28.

Comparisons were made between the performance of an automobile having a conventional air conditioning system installed therein and the same automobile having the form of the invention disclosed in FIGS. 1 and 2 interjected in its air conditioning system, with the following observations.

The test automobile with conventional air conditioning system therein, and with windows closed, idling on a day with ambient temperature at 94° F., cooling failure in passenger compartment was experienced and engine block overheating was indicated within twelve minutes. The cooler shown in FIGS. 1 and 2 was then installed in the air conditioning system of the test automobile, and with windows closed the test automobile was idled, and at the end of two hours at least normal cooling temperature had been maintained and no engine block overheating had been indicated.

In a second corresponding test, with ambient temperature at 82° F., the test automobile, with windows closed and with conventional air conditioning system in operation, cooling failure in passenger compartment was experienced and engine block overheating was indicated after idling twenty-eight minutes. Then, with the cooler installed, and with the windows closed at the end of two hours of idling at least normal cooling temperature had been maintained and no engine block overheating had been indicated.

As a further test with the windows closed, the cooler was put in operation when the test automobile with windows closed indicated passenger compartment cooling failure and engine block overheating, and within one minute compartment cooling temperature was restored and the overheating indicator dropped out of the danger zone.

Another test automobile, with the cooler shown in FIGS. 1 and 2 installed in its air conditioning system, was driven with its windows closed over sixty miles of desert between Phoenix and Yuma, Arizona, with ambient temperature at 107° F., and the test automobile passenger compartment maintained at least normal cooling temperature while its engine block did not indicate overheating while being driven over this stretch of desert.

Still another test automobile in the form of an air conditioned, six cylinder, 1953 Studebaker, which had indicated engine block overheating and cooling failure in compartment at practically all times its motor ran with passenger compartment closed, had the cooler of this invention installed in its air conditioning system, and this test automobile, with passenger compartment closed, was driven for forty-five minutes in heavy traffic in downtown Houston, and at no time during this period did the passenger compartment fail to maintain cooling temperature, nor did this test automobile indicate engine block overheating.

The beneficial results obtained from cooling the automobile engine manifold hot water extend beyond the obvious in that the air drawn through the radiator core and into the engine compartment by the fan 30 can be at a lower temperature than in conventional automobiles since this air picks up less heat from the cooler water passing through the radiator core. In this regard the form of the invention shown in FIGS. 5, 6, and 7, which eliminates the air conditioning system condenser, insures that the air drawn into the engine compartment by the fan 30 is even more cool, since it does not pick up condenser heat as in the case with the two preceding forms of this invention, and as it does from the condensers of conventional automobile air conditioning systems.

Under certain conditions it may not be desired or necessary to circulate all of the hot water from the automobile engine manifold to the cooler in which case a part thereof may be by-passed. An arrangement whereby this may be effected as indicated in FIG. 9 which shows the conduit or hose 21 from the engine manifold 20 provided with a conventional distributing valve 51 therein which is adjustable to proportion the water flowing therethrough to the cooler 19 and the water flowing therethrough and through a by-pass 52 and through a valve 53 opened in such by-pass, the by-pass extending to the conduit or hose 23 which carries the water back to the radiator.

The invention is not limited to the forms thereof shown in the drawings or to the methods hereinabove described, but other structures and methods are included, as such may fall within the broad spirit of the invention and within the broad scope of interpretation claimed and merited for the appended claims.

What is claimed is:

1. For employment with an automobile including a passenger compartment and an engine compartment having therein an engine with a water cooled engine manifold block, a radiator for cooling the water heated in cooling the engine manifold block, and a water pump to pick up the cooled water from the radiator for re-circulation to the engine manifold block, the combination of an automobile air conditioning system comprising in said engine compartment successively in line a refrigerant compressor to deliver refrigerant therefrom as a hot, pressurized gas, a condenser in which to cool and liquefy the refrigerant, a dryer to absorb any moisture from the refrigerant, an expansion valve through which the refrigerant may be needled to relieve the pressure thereon, an evaporator in said passenger compartment to pick up heat therefrom to evaporate part of the refrigerant into a gas, a return refrigerant conduit into said engine compartment with one end connected to said evaporator, said engine compartment also having a return refrigerant conduit separate therefrom for delivery of return refrigerant through an end thereof connected to said compressor, a hot water return conduit with one end connected to said engine manifold block, a hot water return conduit separate therefrom for delivery of the hot water through an end thereof into said radiator, a heat exchanger spaced from the engine and a heat exchanger coil passing sealably therethrough with one of said heat exchanger and said heat exchanger coil having its opposite ends connected to the other ends of said hot water return conduits and with the other of said heat exchanger and said heat exchanger coil having its opposite ends connected to the other ends of said return refrigerant conduits whereby the hot water is cooled in passage to said radiator, and whereby the return refrigerant is evaporated to pass in gaseous state into said compressor.

2. For employment with an automobile including a passenger compartment and an engine compartment having therein an engine with a water cooled engine manifold block, a radiator for cooling the water heated in cooling the engine manifold block, and a water pump to pick up the cooled water from the radiator for re-circulation to the engine manifold block, the combination of an automobile air conditioning system comprising in said engine compartment successively in line a refrigerant compressor to deliver refrigerant therefrom as a hot, pressurized gas, a condenser in which to cool and liquefy the refrigerant, a dryer to absorb any moisture from the refrigerant, an expansion valve through which the refrigerant may be needled to relieve the pressure thereon, an evaporator in said passenger compartment to pick up the heat therefrom to evaporate part of the refrigerant into a gas, a return refrigerant conduit into said engine compartment extending from said evaporator into one side of the top of said radiator, a return refrigerant conduit from the other side of the top of said radiator to said compressor, a hot water return conduit from said engine manifold block into the top of said radiator, a heat exchanger coil passing sealably through the top of said radiator and having its opposite ends connected at the opposite ends of the top of said radiator to said return refrigerant conduits, whereby the hot water is cooled in passage through the top of said radiator before being further cooled in percolating downwardly therethrough, and whereby the return refrigerant is evaporated to pass in gaseous state into said compressor.

3. For employment with an automobile including a passenger compartment and an engine compartment having therein an engine with a water cooled engine manifold block, a radiator for cooling the water heated in cooling the engine manifold block, and a water pump to pick up the cooled water from the radiator for re-circulation to the engine manifold block, the combination of an automobile air conditioning system not having a condenser and comprising in said engine compartment successively in line a refrigerant compressor to deliver refrigerant therefrom as a hot, pressurized gas, a refrigerant delivery conduit with one end connected to said compressor, and a continuation refrigerant delivery conduit separate therefrom, a dryer to absorb any moisture from the refrigerant as a liquid and having an end of said continuation refrigerant delivery conduit connected into the upstream side thereof, an expansion valve through which the cooled, dried liquid refrigerant may be needled to relieve the pressure thereon, an evaporator in said passenger compartment to pick up heat therefrom to evaporate part of the liquid refrigerant into a gas, a return refrigerant conduit into said engine compartment with one end connected to said evaporator, a return refrigerant conduit separate therefrom for delivery of return refrigerant through an end thereof connected to said compressor, a hot water return conduit with one end connected to said engine manifold block, a hot water return conduit separate therefrom for delivery of the hot water through an end thereof into said radiator, a closed heat exchanger, a pair of heat exchanger coils passing in concentric relation sealably through said heat exchanger, of said heat exchanger and said heat exchanger coils one having its opposite ends connected to the other ends of said hot water return conduits, one having its opposite ends connected to the other ends of said refrigerant return conduits, and one having its opposite end connected to the other ends of said refrigerant delivery conduits whereby the hot, pressurized gas from said compressor is cooled in said heat exchanger to a cooled pressurized liquid as aforesaid in heat exchange relation with said return refrigerant, whereby said hot water is cooled in said heat exchanger in heat exchange relation with said return refrigerant, and whereby said return refrigerant is evaporated to pass in gaseous state into said compressor.

4. For employment with an automobile including a passenger compartment and an engine compartment having therein an engine with a water cooled engine manifold block, a radiator for cooling the water heated in cooling the engine manifold block, and a water pump to pick up the cooled water from the radiator for re-circulation to the engine manifold block, the combination of an automobile air conditioning system comprising in said engine compartment successively in line a refrigerant compressor to deliver refrigerant therefrom as a hot, pressurized gas, means cooperative in conducting said hot pressurized gas to be cooled and liquefy and in conducting said cooled refrigerant onwardly, a dryer with said cooperative means adapted to discharge into the upstream side thereof and to absorb any moisture from the refrigerant, a refrigerant expansion valve through which the refrigerant may be needled to relieve the pressure thereon, an evaporator in said passenger compartment to pick up heat therefrom to evaporate part of the refrigerant into a gas, a return refrigerant conduit into said engine compartment and spaced from the engine with one end connected to said evaporator, said engine compartment also having a return refrigerant conduit separate therefrom for delivery of return refrigerant through an end thereof connected to said compressor, a hot water return conduit with one end connected to said engine manifold block, a hot water return conduit separate therefrom for delivery of the hot water through an end thereof into said radiator, a heat exchanger and a heat exchanger coil passing sealably therethrough with one of said heat exchanger and said heat exchanger coil having its opposite ends connected to the other ends of said hot water return conduits and with the other of said heat exchanger and said heat exchanger coil having its opposite ends connected to the other ends of said return refrigerant conduits whereby the hot water is cooled in passage to said radiator, and whereby the return refrigerant is evaporated to pass in gaseous state into said compressor.

5. An automobile air conditioning system as claimed in claim 4 in which said heat exchanger comprises a portion of the conventional return hot water hose from engine manifold block to radiator and in which said hot water return conduits comprise sections of said hose connected to opposite ends of said hose portion.

6. An automobile air conditioning system as claimed in claim 4 in which said hot water return conduits are cross-connected and adapted to by-pass hot water from flowing through said heat exchanger.

References Cited in the file of this patent

UNITED STATES PATENTS

| | | |
|---|---|---|
| 1,036,484 | Glass et al. | Aug. 20, 1912 |
| 1,913,273 | Hammers | June 6, 1933 |
| 2,115,472 | Sargent | Apr. 26, 1938 |
| 2,166,635 | Locke | July 18, 1939 |
| 2,294,036 | Kettering | Aug. 25, 1942 |
| 2,344,865 | Harless | Mar. 21, 1944 |
| 2,430,960 | Soling | Nov. 18, 1947 |
| 2,481,520 | Knoy | Sept. 13, 1949 |
| 2,776,648 | Taylor | Jan. 8, 1957 |
| 2,884,768 | Gould | May 5, 1959 |